United States Patent
Cho et al.

(10) Patent No.: US 7,971,606 B2
(45) Date of Patent: Jul. 5, 2011

(54) FUEL TANK AND CAP DEVICE THEREOF

(75) Inventors: Eun Suk Cho, Yongin (KR); Jun Won Suh, Yongin (KR); Jong Ki Lee, Yongin (KR); Ri A Ju, Yongin (KR); Won Hyouk Jang, Yongin (KR); Dong Yun Lee, Yongin (KR); Sang Hyeon Choi, Yongin (KR); Jin Hong An, Yongin (KR)

(73) Assignee: Samsung SDI Co., Ltd., Yongin-si (KR)

( * ) Notice: Subject to any disclaimer, the term of this patent is extended or adjusted under 35 U.S.C. 154(b) by 395 days.

(21) Appl. No.: 11/373,363

(22) Filed: Mar. 9, 2006

(65) Prior Publication Data
US 2006/0210844 A1    Sep. 21, 2006

(30) Foreign Application Priority Data
Mar. 17, 2005    (KR) .............................. 10-2005-22239

(51) Int. Cl.
*F16K 24/00*    (2006.01)
*F16K 24/04*    (2006.01)
*F16L 37/44*    (2006.01)
(52) U.S. Cl. ....................... 137/588; 137/578; 251/149.6
(58) Field of Classification Search .................. 137/588, 137/578, 202, 587, 438; 251/149.6; 222/464.6
See application file for complete search history.

(56) References Cited

U.S. PATENT DOCUMENTS

| | | | | |
|---|---|---|---|---|
| 2,294,922 A | * | 9/1942 | Malluk | 220/287 |
| 3,628,704 A | * | 12/1971 | Corsette | 222/513 |
| 4,613,112 A | * | 9/1986 | Phlipot et al. | 251/149.6 |
| 4,809,666 A | * | 3/1989 | Baltz | 123/516 |
| 5,657,909 A | * | 8/1997 | Barriac | 222/382 |
| 5,816,298 A | * | 10/1998 | Stricklin et al. | 141/346 |
| 6,293,304 B1 | * | 9/2001 | Broberg | 137/588 |

(Continued)

FOREIGN PATENT DOCUMENTS

JP    26-000993 Y    2/1951

(Continued)

OTHER PUBLICATIONS

Patent Abstracts of Japan, Publication No. 2001-004432; Publication Date: Dec. 1, 2001; in the name of Tachibana.

(Continued)

*Primary Examiner* — John Rivell
*Assistant Examiner* — Atif H Chaudry
(74) *Attorney, Agent, or Firm* — Christie, Parker & Hale, LLP

(57) ABSTRACT

A fuel tank and a cap device for the fuel tank. The fuel tank is connected to a fuel cell and includes a tank body having a fuel opening and a pin hole for maintaining an inside pressure, a floater positioned on a surface of the fuel stored in the tank body, and an air pipe connected to the pin hole and an upper part of the floater. The cap device includes a cap body having an inside transfer path for connecting an inlet opening for introducing the fuel and an outside transfer pipe, a fixed outer cap including a connector for fixing a discharge opening into which the transfer pipe is inserted, and an elastic opening/closing section in which the cap body is elastically compressible by the connector, and wherein the inside transfer path opens during the compression.

13 Claims, 4 Drawing Sheets

U.S. PATENT DOCUMENTS

| | | | |
|---|---|---|---|
| 6,394,132 B1 * | 5/2002 | Walcome | 137/614.2 |
| 6,431,195 B1 * | 8/2002 | Parker et al. | 137/2 |
| 7,080,657 B1 * | 7/2006 | Scott | 137/15.18 |
| 2007/0084868 A1 | 4/2007 | Huber et al. | |

FOREIGN PATENT DOCUMENTS

| | | |
|---|---|---|
| JP | 01-169230 | 7/1989 |
| JP | 07-277400 | 10/1995 |
| JP | 11-091866 | 4/1999 |
| JP | 2001-4432 | 1/2001 |
| WO | WO 2005/014467 A1 | 2/2005 |

OTHER PUBLICATIONS

Japanese Office action dated Nov. 2, 2010, for corresponding Japanese Patent application 2005-368094, noting listed references in this IDS, as well as JP 26-000993 and U.S. Publication 2005/0014467, both previously filed in an IDS dated Oct. 22, 2009.

Japanese Office action dated May 19, 2009, for corresponding Japanese application 2005-368094, noting listed references in this IDS.

* cited by examiner

FUEL TANK AND CAP DEVICE THEREOF

CROSS-REFERENCE TO RELATED APPLICATIONS

This application claims priority to and the benefit of Korean Patent Application No. 10-2005-0022239, filed on Mar. 17, 2005 with the Korean Intellectual Property Office, the entire content of which is incorporated herein by reference.

BACKGROUND

1. Field of the Invention

The present invention relates to a fuel tank suitable for a fuel cell system for a mobile power source and a cap device for the fuel tank.

2. Discussion of the Related Art

A fuel tank stores a predetermined amount of fuel, and supplies the stored fuel to specific devices or systems. Typically, the fuel tank is composed of a tank body and a lid for sealing a fuel opening through which fuel is injected into the tank body. Additionally, a transfer pipe for transferring fuel to devices or systems is connected to the fuel tank.

The fuel tank may be used in various devices requiring liquid fuel. For example, the fuel tank may be used in vehicles using chemical energy as a power source, or a power generator such as a fuel cell that produces electrical energy from chemical energy of a fuel.

A fuel cell is a device that generates electrical energy through an electrochemical reaction of hydrogen and oxygen. The fuel cell system produces electrical energy by using liquid fuel such as methanol supplied from a fuel tank. The above-mentioned fuel cell system is classified into a fuel cell system for a mobile power source, a fuel cell system for transport, and a fuel cell system for distributed-generation of electricity.

More specifically, the fuel cell system for a mobile power source means a mobile power source, or a fuel cell system used for charging portable telecommunication equipment. A fuel cell of a Polymer Electrolyte Membrane Fuel Cell (PEMFC) and a Direct Methanol Fuel Cell (DMFC) using a high molecular electrolyte film may be used as a fuel cell suitable for a mobile power source.

When a fuel tank used in a fuel cell system for a mobile power source is hand-carried or carried by a car, the fuel tank may sway violently or may be inclined on its side depending on the system mounting or the transport state.

If the fuel tank sways violently or is inclined on its side, the fuel in the fuel tank may not be supplied to the fuel cell smoothly, reducing the output of the fuel cell. Thus, an apparatus which uses the fuel cell system as a power source can not operate as desired.

Further, if the fuel tank sways violently or is inclined on its side, fuel depletion takes place at an anode side of the fuel cell. In this case, a catalyst layer of the anode side may become eroded when the catalyst layer chemically reacts with oxygen from a cathode side. This erosion may damage the stability and shorten the lifespan of the fuel cell.

SUMMARY OF THE INVENTION

A fuel tank is provided that can supply fuel continuously and smoothly even if the fuel tank sways violently or is inclined on its side.

Additionally, a fuel tank is provided that can be connected or separated easily from a system on which the fuel tank is mounted or a cap device for the fuel tank.

More specifically, the fuel tank includes a tank body including a fuel opening and a pin hole for maintaining an inside pressure of the tank body, a floater positioned on a surface of the fuel stored in the tank body, and an air pipe of which an end is connected to the pin hole and an upper part of the floater, respectively.

The fuel tank may further include a cap device covering the fuel opening and connected to an outside transfer pipe.

The fuel tank may also include a fuel pipe for transferring fuel from the tank body to the cap device.

The cap device includes a cap body having an inside transfer path to connect the fuel pipe and the transfer pipe. A fixed outer cap includes a discharge opening into which the transfer pipe is inserted and a connector for fixing the transfer pipe to the discharge opening. The cap body has an elastic opening/closing section which is compressed elastically by the connector, and opens the inside transfer path when the connector is compressed.

The connector includes a connector body which is disposed in the discharge opening by insertion, the connector having a hollow pipe shape. One end of the connector has a connector flange having a diameter larger than the diameter of the discharge opening. The connector also includes a hollow insertion member, a portion of which is inserted into the transfer pipe, and is projected by a predetermined distance from the end portion of the transfer pipe.

The elastic opening/closing section includes a spring, an opening/closing housing in which the spring is arranged and having an opening section on one side, and a head section which is connected to the opening section of the opening/closing housing and reciprocates elastically by the spring.

The cap body may be connected to an inner periphery surface of the fuel opening by a screw. The fixed outer cap may be connected to an outside periphery surface of the fuel opening by a screw. The cap body includes a flange section inserted between the fixed outer cap and an end section of the fuel opening. The cap body includes a pin hole for maintaining an inside pressure of a fuel tank and is connected to the outside through a screw connection gap between the fixed outer cap and the fuel opening.

DETAILED DESCRIPTION

Figure 1:
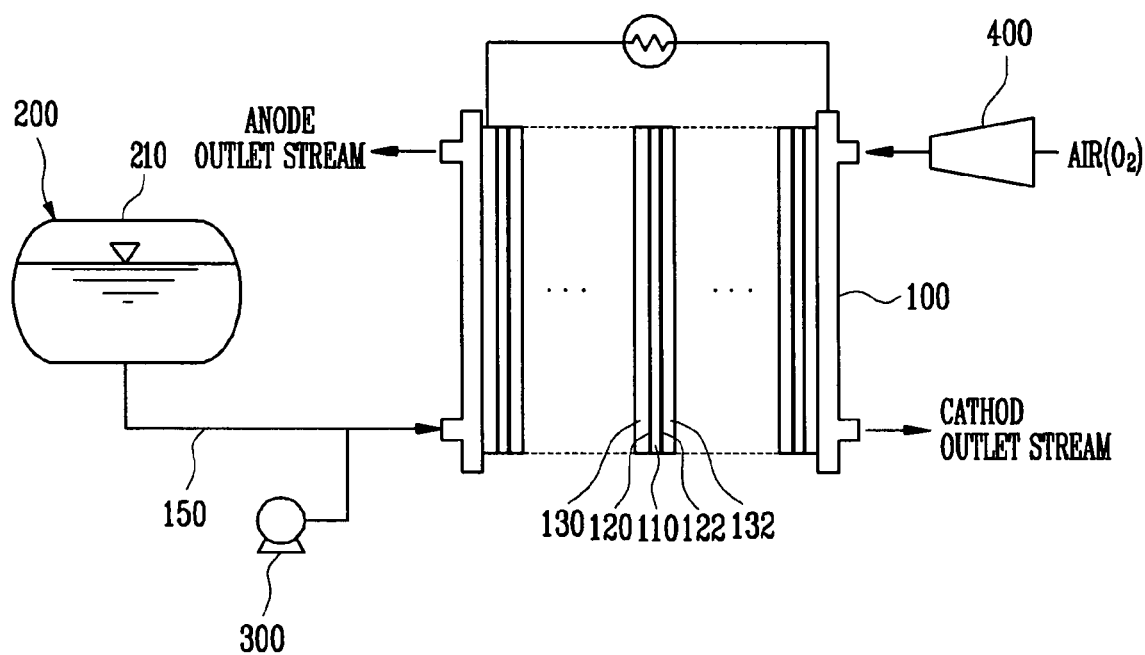
FIG. 1 is a block diagram schematically showing a fuel cell system in which a fuel tank according to the present invention is employed.

Referring to FIG. 1, the fuel cell system is composed of a fuel cell 100, a fuel tank 200, a fuel pump 300 and an air pump 400.

The fuel cell 100 includes at least one unit cell that functions as an individual electricity generation section to generate electric energy. A plurality of unit cells are laminated to form a fuel cell stack. The fuel cell 100 includes a membrane-electrode assembly (MEA) comprising high molecular electrolyte film 110 and electrodes 120, 122 adhered to both sides of the film 110, and separators 130, 132 attached to both sides of the MEA for transferring the fuel to the anode electrode 120 and the cathode electrode 122, respectively. The separators 130, 132 may be omitted depending upon the structure of the fuel cell 100.

The air pump 400 is connected to the cathode side of the fuel cell 100 and supplies air or oxygen to the cathode electrode 132.

The fuel pump 300 is connected to a transfer pipe 150. The fuel pump 300 generates a predetermined pressure in the transfer pipe 150, thereby channeling the fuel stored in the fuel tank 200 to the anode side of the fuel cell 100. The fuel pump 300 supplies a sufficient amount of fuel for continuous and stable operation of the fuel cell 100.

The fuel tank 200 stores a predetermined amount of fuel. The fuel stored in the fuel tank 200 is discharged through the transfer pipe 150 to the anode side of the fuel cell 100. Even when the fuel cell system is swaying or is inclined on its side, the fuel tank 200 is designed to supply fuel to the fuel cell 100, as described in more detail below.

Figure 2:
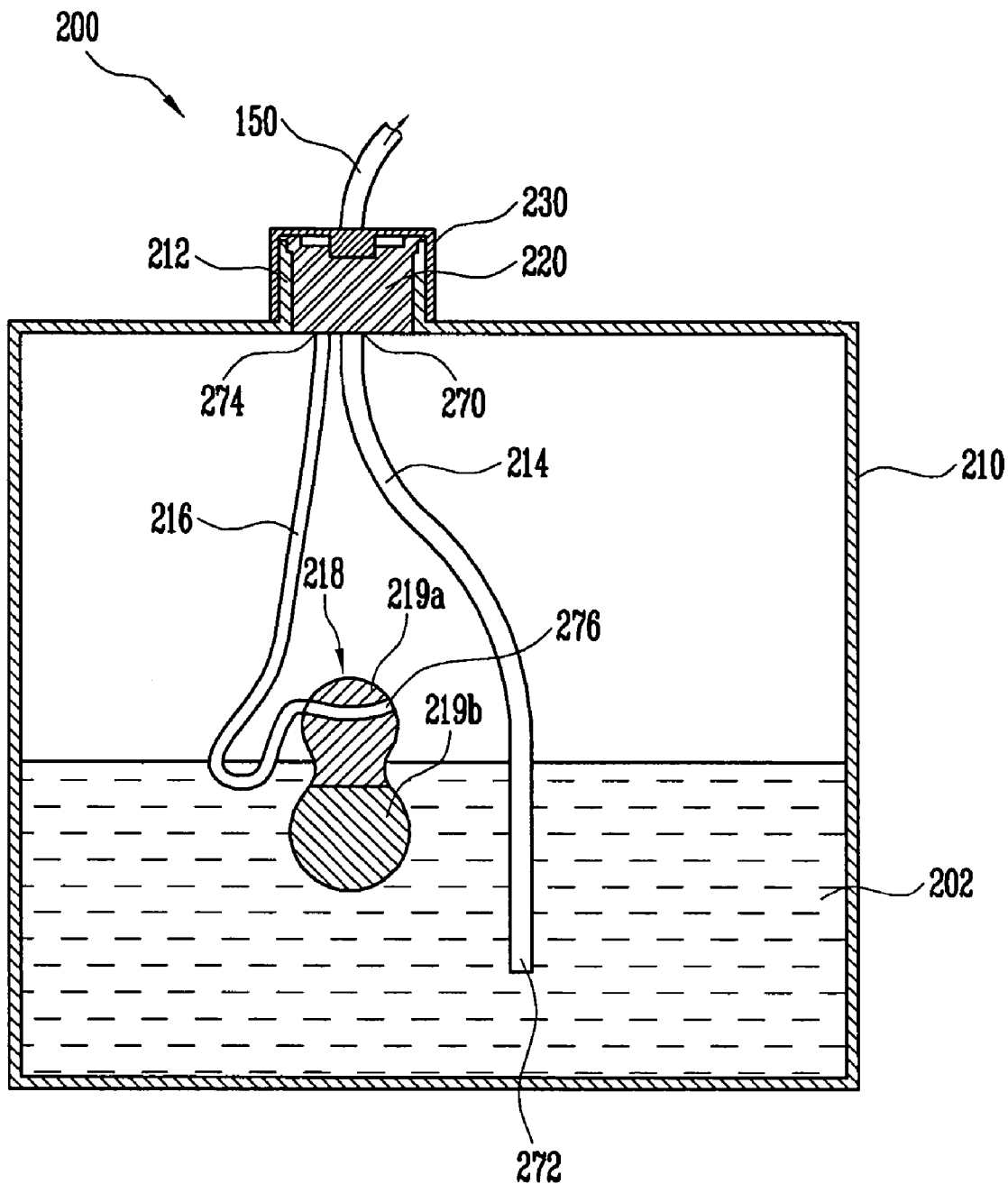
FIG. 2 shows a fuel tank according to one embodiment of the present invention.

Referring to FIG. 2, the fuel tank 200 is composed of a tank body 210, a fuel pipe 214, an air pipe 216, a floater 218 and a cap device. The cap device includes a cap body 220 and a fixed outer cap 230.

More specifically, the tank body 210 stores a predetermined amount of fuel 202. In one exemplary embodiment, the fuel 202 stored in the fuel tank 200 is methanol.

The tank body 210 may be formed as a container of plastic or metal or a combination of plastic and metal. The tank body 210 is provided with a fuel opening 212 through which fuel is supplied.

The fuel pipe 214 transfers the fuel 202 stored in the tank body 210 to the cap body 220 based on outside pressure. The fuel pipe 214 may include a flexible pipe, a plastic pipe, or a metal pipe. The fuel pipe 214 has a cap end 270 connected to the cap body 220 and a fuel end 272 submerged in the fuel 202.

The fuel pipe 214 may be a flexible pipe allowing the fuel pipe 214 to submerge corresponding to gravity. That is, when the fuel tank 200 is inclined, the fuel end 272 of the fuel pipe 214 submerges in the fuel 202 due to its own weight. Accordingly, the stored fuel 202 is transferred to the cap body through the fuel pipe 214 according to outside pressure regardless of the incline of the fuel tank 200. In one exemplary embodiment the fuel end 272 of the fuel pipe 214 may be made heavier by providing a suitable means such as a pendulum.

The air pipe 216 enables air to flow from outside of the fuel tank 200 to inside of the fuel tank 200 in order to maintain the inner pressure of the fuel tank 200 appropriately. The air pipe 216 may be formed from, for example, a flexible rubber pipe or a flexible plastic pipe. A cap end 274 of the air pipe 216 is connected to the cap body 220 and a fuel end 276 is exposed to the air above the upper surface of the fuel 202.

The fuel end 276 of the air pipe 216 may be provided with a floater 218. Thus, even though the fuel cell system may sway or be inclined on its side, the fuel end 276 of the air pipe 216 is always exposed to the air above the upper surface of the fuel 202. The floater 218 may have a structure such as a snowman shape or an hourglass with the lower part 219*b* of the floater 218 being heavier than the upper part 219*a* of the floater 218. Therefore, the lower part 219*b* of the floater 218 is submerged in the fuel 202, and the upper part 219*a* is exposed to the air above upper surface of the fuel 202. In this embodiment, the fuel end 276 of the air pipe 216 is connected to a through hole formed on the upper part 219*a* of the floater 218, thereby maintaining an air path. Outside air may be introduced into the fuel tank 200 stably through the air path.

According to the above-mentioned structure, even when fuel stored in the fuel tank 200 is reduced, atmospheric pressure is maintained in the fuel tank 200. Thus, even though the fuel tank 200 may sway or be is inclined on its side, the fuel can be stably discharged.

In an alternate embodiment, the cap end 274 of the air pipe 216 may be connected to another pin hole (not shown) formed on the upper side of the tank body 210.

The cap device is composed of a cap body 220 and a fixed outer cap 230. The cap device seals a fuel opening 212 of the tank body 210 completely and is connected to the outside transfer pipe 150. The cap device will be explained in more detail below.

Figure 3:
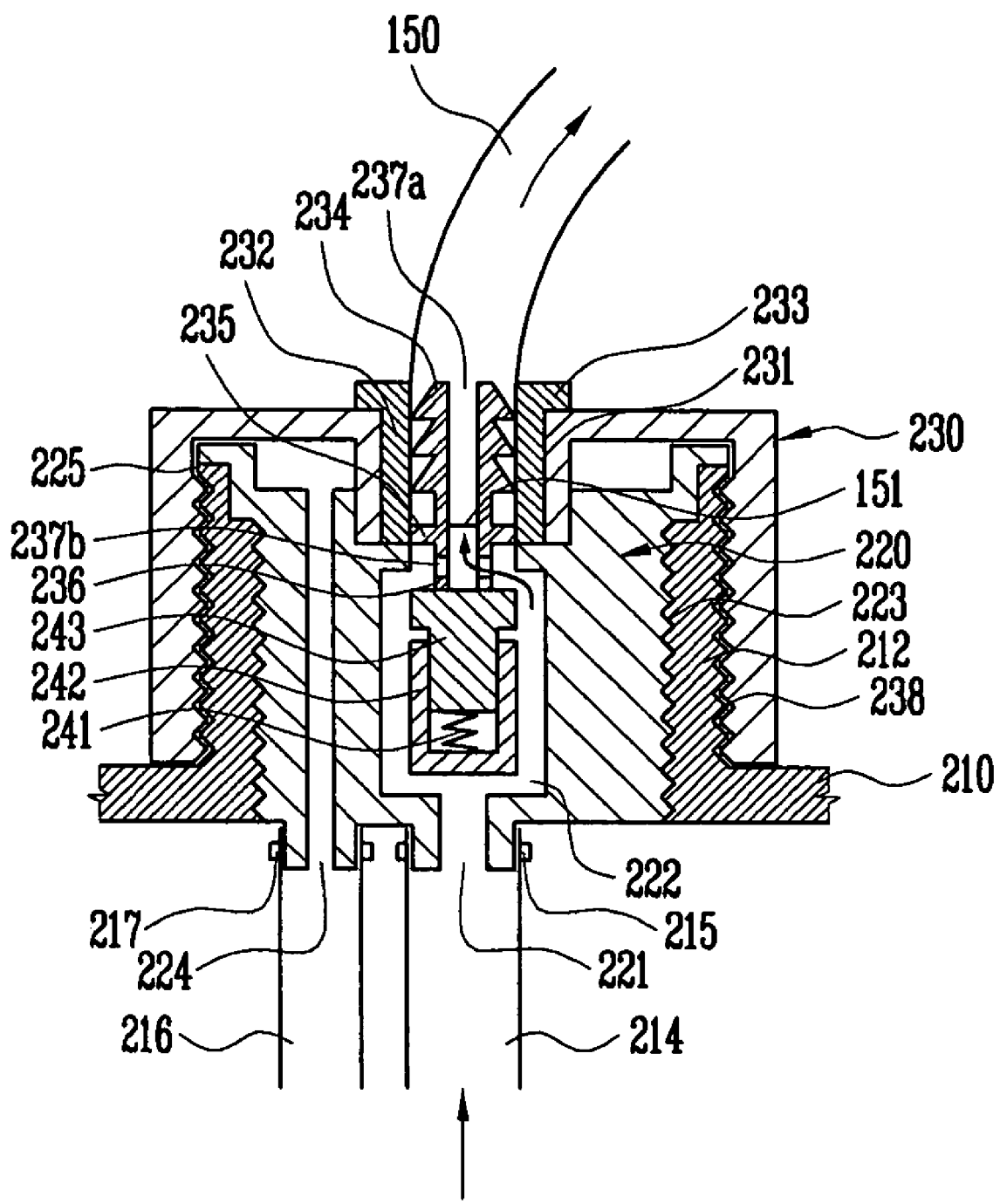
FIG. 3 is a cross-sectional view showing a cap device of the fuel tank of FIG. 2 when a transfer pipe is fully inserted in the fuel tank of FIG. 2.
Figure 4:
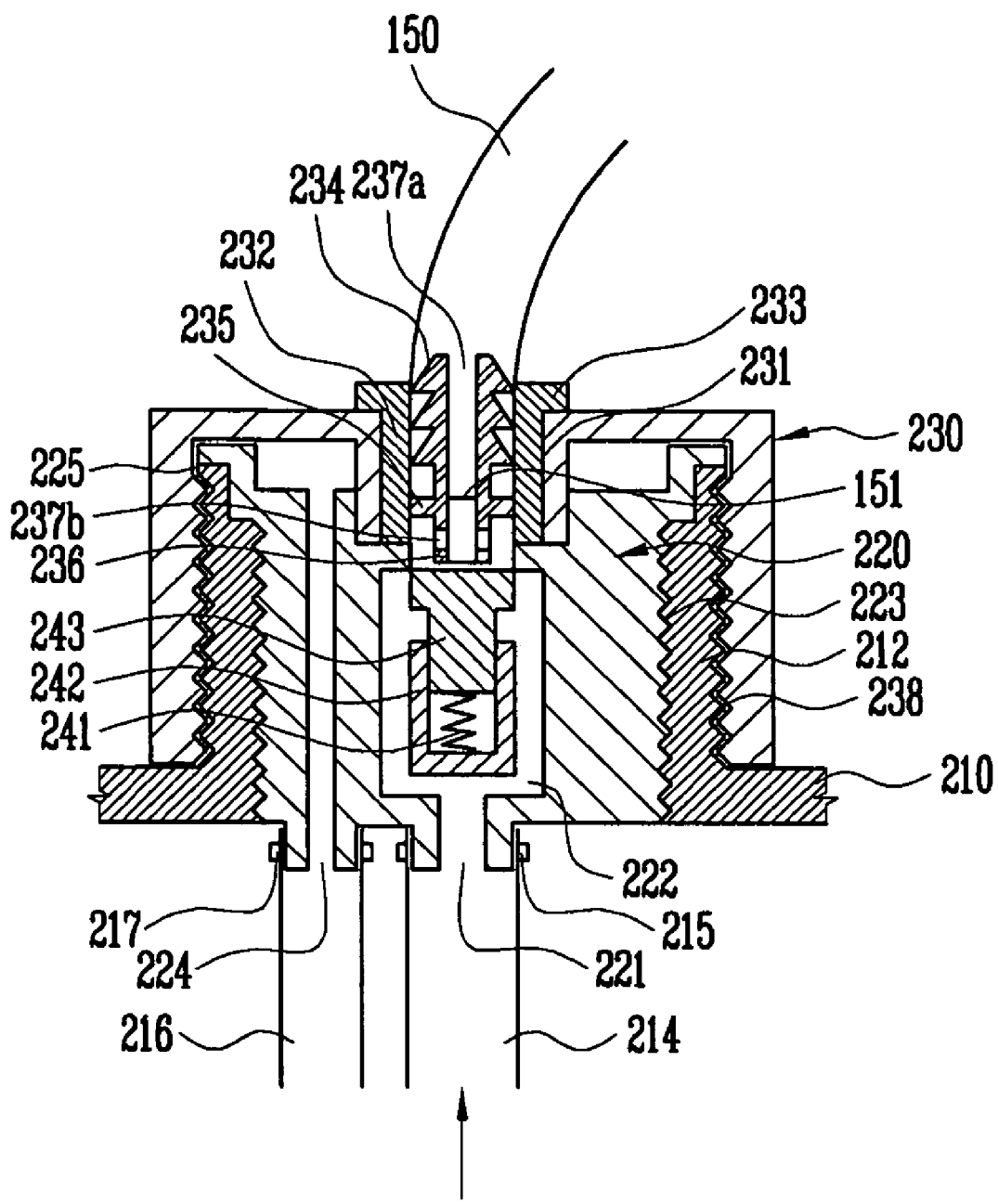
FIG. 4 is a cross-sectional view showing a cap device before the transfer pipe is fully inserted in the fuel tank of FIG. 2.
Figure 1:
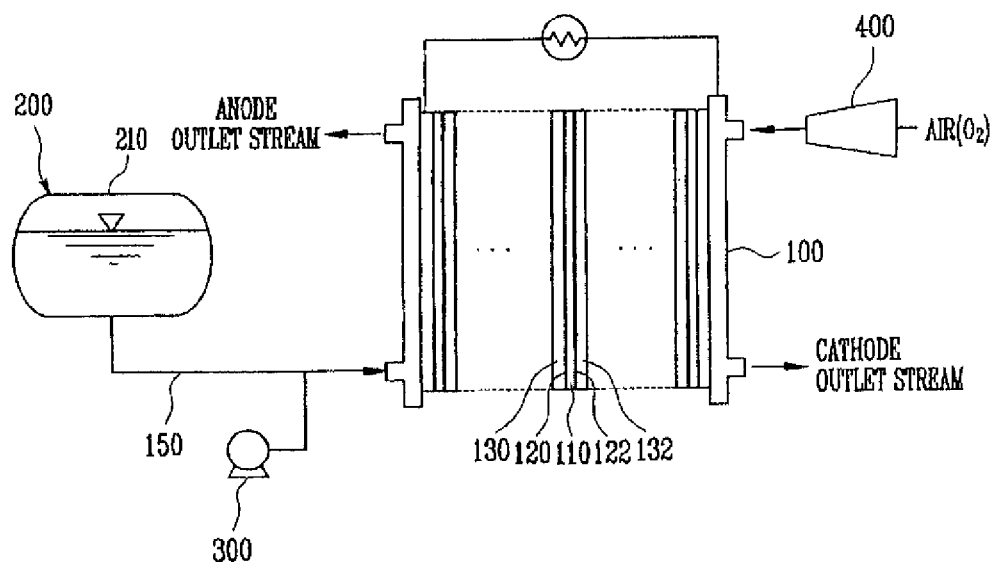

Referring to FIGS. 3 and 4, the cap device is composed of a cap body 220 connected to the inner periphery of the fuel opening 212 and a fixed outer cap 230 connected to the outer periphery of the fuel opening 212 in a screw-coupling manner, for example.

The cap body 220 has a hollow cylindrical shape. The cap body 220 has an inlet opening 221 to which the cap end 272 of the fuel pipe 214 is connected so that the fuel in the fuel tank 210 is introduced through the fuel pipe 214, and an inside transfer path 222 for transferring the fuel introduced through the inlet opening 221 to the transfer pipe 150. Further, the cap body 220 includes a screw connection section 223 formed on its outside periphery, and a hole 224 penetrating between a lower side and an upper side. The hole 224 includes a pinhole with a small diameter. An air pipe 216 is connected to the hole 224 at the lower side of the cap body 220. The fuel pipe and the air pipe 214, 216 are connected and then fixed to the lower side of the cap body 220 by a fixing means 215, 217.

An elastic opening/closing section is inserted through an upper opening of the cap body 220 and mounted therein. The inside transfer path 222 is formed between the inner wall of the cap body 220 and the elastic opening/closing section.

The elastic opening/closing section is composed of a spring 241, an opening/closing housing 242 in which the spring 241 is seated and a head section 243 inserted in the opening/closing housing 242 and elastically supported by the spring 241. The opening/closing housing 242 is inserted and mounted in the inside space of the cap body 220, and the head section 243 is biased toward the upper portion of the inside space by the spring 241. For example, the opening/closing housing 242 and the cap body 220 are formed in a body by an injection molding process and/or a bonding process. The bonding process includes a step for bonding a first half cap body having a first half opening/closing housing and a second half cap body having a second half opening/closing housing. In FIGS. 3 and 4, the connection between the opening/closing housing 242 and the cap body 220 is not shown.

The fixed outer cap 230 is formed as a lid shape for sealing the fuel opening 212 of the tank body 210. The fixed outer cap 230 includes a discharge opening 231 having a connector assembly inserted therein.

The connector assembly is a means for fixing the transfer pipe 150 to the inside of the discharge opening 231. The connector assembly includes a connector body 232 and a hollow insertion member 234.

A portion of the connector body 232 is inserted and fixed to the discharge opening 231. The connector body 232 includes a connector flange 233 preventing the entire connector body form being inserted into the discharge opening 231. An adhesive may be coated between the discharge opening 231 and the connector body 232 for more securely fixing the connector body 232. The connector body 232 may be a flexible plastic or an elastic member. Such structure can improve the adhesiveness between the connector body 232 and the transfer pipe inserted into the inside of the connector body 232, and enables the transfer pipe 150 to be connected and separated from the connector body 232.

The hollow insertion member 234 is inserted and fixed to the inside of the transfer pipe 150. The outer surface of the hollow insertion member 234 has wedged projections press-fitted to the inside of the transfer pipe 150. Further, the hollow insertion member 234 includes a stopping jaw 235 limiting the insertion amount of the member 234 into the transfer pipe 150. The hollow insertion member 234 protrudes from the end section 151 of the transfer pipe 150. The projection section 236 presses the head section 243 of the elastic opening/closing section when the transfer pipe 150 is inserted, thereby opening the inside transfer path 222. Further, the hollow insertion member 234 includes a hollow section 237a, and the side of the projection section 236 is formed with an opening 237b adapted to be in communication with the hollow section 237a. The fuel discharged via the hollow section 237a and the opening 237b from the tank body 210 flows into the transfer pipe 150.

Further, the fixed outer cap 230 includes a screw connection section 238 in the inner periphery thereof. The screw connection section 238 is coupled with a screw connection section formed on the outside periphery surface of the fuel opening 212 of the tank body 210, creating a gap between the inner periphery surface of the fixed outer cap 230 and the outside periphery surface of the fuel opening 212. This gap is placed in communication with the air pipe 216 and the hole 224. In this structure, when the fuel of the fuel tank is discharged into the transfer pipe 150, atmospheric pressure is maintained.

In one exemplary embodiment the fuel cell system on which a fuel tank is mounted is composed of a fuel cell of a high polymer electrolyte type or a fuel cell of a direct methanol type.

According to the above-mentioned structure, even when the fuel cell system sways or is inclined on its side, the fuel of the fuel tank is supplied to the fuel cell continuously and smoothly. Such fuel tank may be used in the fuel cell system for a mobile power source.

Further, the present invention provides a system that allows easy connection and separation of the fuel tank and the transfer pipe. Thereby it is possible to separate the fuel tank and use it independently of the transfer pipe. Consequently, it is very easy to carry and transport the fuel tank.

Further, when the transfer pipe is separated from the fuel tank, the discharge opening of the fuel tank is closed automatically (as depicted in FIG. 4), and thus fuel leakage can be prevented. In this case, the present invention can provide a method for preventing fuel leakage from a fuel tank when a fuel transfer pipe for providing fuel from the fuel tank is separated from the fuel tank, the method comprising: providing a fuel tank including a fuel tank body for storing fuel, the fuel tank body having a fuel discharge opening capped by a cap device, the cap device including a cap body having an inside transfer path for coupling a fuel inlet opening of the cap body to an outside transfer pipe and having a fixed outer cap having a discharge opening and a connector, the outside transfer pipe being inserted into the discharge opening and the connector fixing the outside transfer pipe to the discharge opening; and mounting an elastic opening/closing section in the cap body, the elastic opening/closing section being adapted to close the inside transfer path upon separation of the connector from the cap body.

Although exemplary embodiments of the present invention have been shown and described, it would be appreciated by those skilled in the art that changes might be made in this embodiment without departing from the principles and the spirit of the invention, the scope which is defined in the claims and their equivalents.

What is claimed is:

1. A fuel tank for a fuel cell comprising,
   a tank body for storing fuel, the tank body having a threaded wall defining a fuel discharge opening;
   a cap covering the fuel discharge opening and coupling the tank body with a transfer pipe for transferring fuel from the tank body through the fuel discharge opening, the cap comprising a threaded fixed outer cap screw-coupled to the threaded wall defining the fuel discharge opening such that there is a gap between the threaded fixed outer cap and the threaded wall, wherein the cap has a pin hole providing an open two-way air path between inside the tank body and outside the fuel tank for maintaining an inside air pressure applied to fuel stored in the tank body;
   a floater having a lower portion positionable in the fuel stored in the tank body and an upper portion exposed to air in the tank body; and
   an air pipe having a cap end and a fuel end, the cap end being connected to the pin hole and the fuel end being connected to the upper portion of the floater.

2. The fuel tank of claim 1, further comprising a fuel pipe coupled to the cap for transferring fuel in the tank body to the cap.

3. The fuel tank of claim 1, wherein the cap further comprises:
   a cap body having an inside transfer path for coupling a fuel inlet opening of the cap body to the transfer pipe;
   wherein the fixed outer cap has a cap discharge opening and a connector, the outside transfer pipe being inserted into the cap discharge opening and the connector fixing the outside transfer pipe to the cap discharge opening; and
   wherein the cap further comprises an elastic opening/closing section mounted in the cap body, the elastic opening/closing section being adapted to open the inside transfer path upon insertion of the connector into the cap body.

4. The fuel tank of claim 3, wherein the connector includes a connector body in the cap discharge opening;
   wherein the connector has a hollow pipe shape,
   wherein an end of the connector has a connector flange having a diameter larger than a diameter of the cap discharge opening; and
   wherein a hollow insertion member is in the transfer pipe.

5. The fuel tank of claim 3, wherein the elastic opening/closing section comprises:
   an opening/closing housing including a spring and an opening section at one side of the housing, and
   a head section biased toward the connector by the spring, the head section opening the inside transfer path when the connector is in the cap body.

6. The fuel tank of claim 3, wherein the cap body is screw-coupled with the threaded wall defining the fuel discharge opening.

7. The fuel tank of claim 3, wherein the pin hole is on the cap body and allows access to an exterior of the fuel tank through the gap between the fixed outer cap and the fuel discharge opening of the tank body.

8. The fuel tank of claim 1, wherein the cap is adapted to prevent fuel from being transferred through the cap before a transfer pipe is inserted into the cap and is adapted to allow fuel to be transferred through the cap in response to a transfer pipe being inserted into the cap.

9. A cap for covering a fuel opening of a fuel tank comprising:
 a cap body having an inside transfer path for coupling a fuel opening of the cap body to an outside transfer pipe and a threaded outer peripheral surface for coupling the cap to a threaded wall defining the fuel opening;
 a fixed outer cap having a cap discharge opening adapted to engage the outside transfer pipe, a connector adapted to fix the outside transfer pipe to the cap discharge opening and a threaded inner peripheral surface for coupling the cap to the threaded wall defining the fuel opening such that there is a gap between the fixed outer cap and the threaded wall;
 an elastic opening/closing section in the cap body, the elastic opening/closing section being configured to open the inside transfer path in response to insertion of the outside transfer pipe into the cap body; and
 a pin hole for maintaining an inside pressure of the fuel tank, the pin hole providing open two-way access between inside the fuel tank and outside the fuel tank through a gap between the fixed outer cap and the fuel opening.

10. The cap for a fuel tank of claim 9, wherein the connector includes a connector body in the cap discharge opening,
 wherein the connector has a hollow pipe shape,
 wherein an end of the connector includes a connector flange having a diameter larger than a diameter of the cap discharge opening, and
 wherein a hollow insertion member is in the outside transfer pipe.

11. The cap for a fuel tank of claim 9, wherein the elastic opening/closing section comprises:
 an opening/closing housing having a spring and an opening section at one side, and
 a head section biased toward the connector by the spring, the head section opening the inside transfer path when the connector is in the cap body.

12. The cap for a fuel tank of claim 9, wherein the cap body has a flange section adjacent the fixed outer cap.

13. A method for supplying fuel continuously from a fuel tank, the—fuel tank including a tank body for storing fuel, the tank body having a threaded wall defining a fuel opening, and a cap covering the fuel opening, the cap comprising a threaded fixed outer cap screw-coupled to the threaded wall defining the fuel opening such that there is a gap between the threaded fixed outer cap and the threaded wall, the threaded fixed outer cap having a cap discharge opening for coupling the tank body to a transfer pipe and a pin hole providing an open two-way air path between inside the tank body and outside the fuel tank for maintaining an inside air pressure applied to fuel stored in the tank body; the method comprising:
 inserting a transfer pipe into the discharge opening to open an inside transfer path allowing fuel to be transferred through the cap;
 locating a floater above a surface of fuel stored in the tank body such that the floater is exposed to the air above the surface of the fuel;
 connecting a cap end of an air pipe to the pin hole; and
 connecting a fuel end of an air pipe to a portion of the floater exposed to the air above the surface of the fuel.

* * * * *

UNITED STATES PATENT AND TRADEMARK OFFICE
CERTIFICATE OF CORRECTION

| | | |
|---|---|---|
| PATENT NO. | : 7,971,606 B2 | Page 1 of 2 |
| APPLICATION NO. | : 11/373363 | |
| DATED | : July 5, 2011 | |
| INVENTOR(S) | : Eun Suk Cho et al. | |

It is certified that error appears in the above-identified patent and that said Letters Patent is hereby corrected as shown below:

On the Title Page

(56) References Cited,    Delete "Dec. 1, 2001;"

Other Publications,    Insert -- Jan. 12, 2001; -- page 1, line 2.

In the Drawings

Sheet 1 of 4, FIG. 1.    Delete Drawing Sheet 1 and substitute therefore the Drawing Sheet consisting of FIG. 1, as shown on the attached page.

In the Claims

Column 8, Claim 13, line 11.    Delete "the-fuel"

Insert -- the fuel --

Signed and Sealed this

Second Day of October, 2012

David J. Kappos
*Director of the United States Patent and Trademark Office*